Dec. 13, 1955 J. G. FRAYNE 2,727,097

SPEED CONTROL FOR MAGNETIC TAPE DRIVING MEANS UTILIZING THE RECORDED BIAS SIGNAL

Filed Oct. 18, 1952

INVENTOR
J. G. FRAYNE
BY J. F. McEneany
ATTORNEY

United States Patent Office 2,727,097

Patented Dec. 13, 1955

2,727,097

SPEED CONTROL FOR MAGNETIC TAPE DRIVING MEANS UTILIZING THE RECORDED BIAS SIGNAL

John G. Frayne, Pasadena, Calif., assignor, by mesne assignments, to Westrex Corporation, a corporation of Delaware Application October 18, 1952, Serial No. 315,585

5 Claims. (Cl. 179—100.2)

Figures 1, 2:
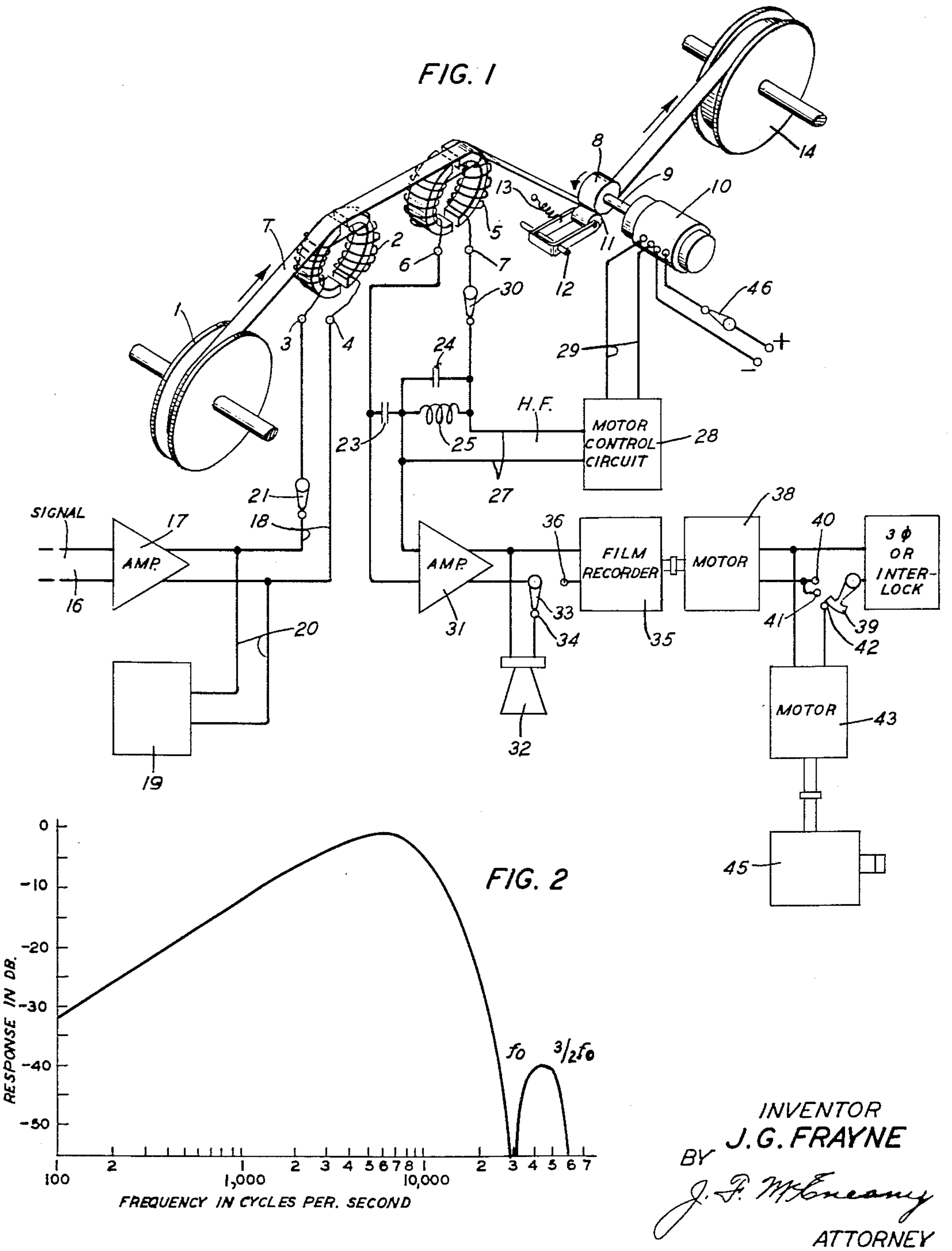

This invention relates to magnetic recording and reproducing systems, and particularly to an improved method of and means for controlling the speed of a non-perforated magnetic sound tape to obtain synchronous reproduction of the sound and an accompanying picture projected from a separate photographic picture film.

It has been found advantageous in many instances to record sound on and reproduce sound from a pulley-driven non-perforated magnetic tape simultaneously with the recording of a picture image on and the reproduction from a marginally perforated photographic picture film propelled by sprockets.

As the non-perforated magnetic tape in a non-synchronous magnetic record-reproducer is driven by a motor-driven pulley, uniform forward motion of the tape is not consistently obtained. Therefore, unless driven during reproduction with the same speed variations experienced during recording, the sound reproduced from this magnetic sound tape will not be in synchronism with the picture image projected from a picture film which was recorded simultaneously therewith.

Several systems capable of producing synchronous reproduction of sound from magnetic tape and images from photographic film have been proposed heretofore. In these proposed systems it is necessary to record a control track on the magnetic tape in addition to the signal and biasing currents. The control track must then be separately reproduced as an electric current, the frequency of which must be compared with a standard to obtain a difference frequency usable to vary the speed of the capstan driving motor. Such systems necessitate the use of an additional recording channel for the control track and relatively expensive, specially designed reproducing control equipment.

It is an object of this invention to provide an improved method of and means for automatically continuously adjusting during reproduction the speed of a non-perforated pulley-driven magnetic tape, the speed of which at any instant corresponds to the speed of the tape at the time the sounds were recorded thereon.

In accordance with this invention, the speed of the tape driving motor during reproduction is automatically continuously increased or decreased in response to variations in the frequency of the reproduced biasing current below or above the fixed frequency of the biasing current previously applied to the tape during recording.

Further in accordance with this invention, a sufficiently high level of reproduced biasing current is obtained for control purposes during reproduction by applying to the tape during recording a biasing current of a frequency which corresponds to the secondary peak frequency of the recording system. This secondary peak frequency is equal to one and one-half times the extinction frequency of the recording system. The extinction frequency of the recording system is determined by the width of the air-gap in the reproducing magnetic head and the speed of the tape during recording.

A system in accordance with applicant's invention requires no additional control track recording channel and relatively inexpensive and conventional motor control apparatus may be employed during reproduction.

The invention will be more readily understood from the following description taken in connection with the accompanying drawing in which:

Fig. 1 is a diagrammatic representation of a magnetic tape recording and reproducing system in accordance with this invention; and Fig. 2 is a curve showing the frequency response for a magnetic tape recorder using a particular tape speed and a particular effective air-gap width in the magnetic reproducing head.

Referring to Fig. 1, numeral 1 indicates a supply reel for a non-perforated magnetic tape T. This tape travels in the direction of the arrow across the recording air-gap of a magnetic recording head 2, the winding of which is connected to terminals 3 and 4. The tape T then passes across the air-gap of a monitoring or reproducing magnetic head 5, the winding of which is connected to terminals 6 and 7. Following its engagement with magnetic head 5, the tape T is engaged by smooth pulley 8 which is mounted on shaft 9 of electric motor 10. A roller 11 pivoted at 12, is urged by spring 13 against the tape T on pulley 8. The roller 8 is rotated in a direction indicated by the arrow to draw the tape from the feed reel 1 and feed it to a take-up reel 14. Take-up reel 14 is driven from a power source through a conventional friction clutch not shown in the drawings.

A recording circuit includes a speech channel 16 connected to the input of an amplifier 17, the output of which is connected through leads 18 to the terminals 3 and 4. Biasing current for the recorder is obtained from an oscillator and amplifier unit indicated at 19. The output of the oscillator unit is connected to the recording circuit by leads 20. The recording circuit is connected to the recording magnet 2 through a switch 21. It is customary to insert a network at the output of amplifier 17 to present a high impedance to the bias frequency.

A reproducing circuit is connected to the reproducing magnetic head 5 through terminals 6 and 7. Both the audio signal frequencies and the supersonic biasing frequency previously recorded on the tape are reproduced by head 5. A suitable dividing network including condensers 23 and 24 and coil 25 is provided in the reproducing channel to separate the supersonic biasing frequency from the audio or signal frequencies. The filtered biasing current is then transmitted by conductors 27 to a motor control circuit included in a housing 28. Conductors 29 connect the motor control circuit to a control winding in the motor 10. A switch 30 provides means for connecting the reproducing circuit to terminals 6 and 7.

The signal currents are suitably amplified by an amplifier 34 and transmitted for reproduction to a loudspeaker 32 through switch 33 and contact 34. By rotating switch 33 to contact 36, the reproduced signal currents may be rerecorded onto a photographic film propelled by a sprocket drive housed in a conventional sound film rerecorder indicated at 35. The film recorder is provided with a light source and a conventional light modulating device responsive to received signal currents. If so desired, the blade of switch 33 may be so constructed that both contacts 34 and 36 are engaged thereby, to thus permit the use of loudspeaker 32 as a monitoring device for the sounds being recorded on a film in recorder 35.

Recorder 35 is driven by a motor 38 which is connected to a source of frequency regulated three-phase alternating current or to an interlock motor system through a switch 39 and contact 40. If it is desired at the time of rerecording to project to a screen the images from an accompanying picture film, the switch 39 may be made to engage contacts 41 and 42 to thus energize motor 38 and a motor 43 adapted to drive a picture projector 45.

In a sound picture recording operation, a picture camera is substituted for projector 45 and the switch 39 engages contact 42 only. To initiate a recording operation, the switch 30 is opened, the switch 21 is closed, the switch 39 is closed to contact 42 and a starting switch 46 in the circuit to motor 10, is closed.

At the completion of the recording operation the magnetic tape T is rewound on feed reel 1 in preparation for reproduction of the sounds therefrom. A positive print picture film is obtained from the recorded negative and placed in the projector 45.

To initiate the synchronous reproduction of the sound and picture, switch 21 is opened, switch 30 is closed, switch 46 is closed to start motor 10 and switch 39 is simultaneously closed on contact 42 to start motor 43. The sound is then reproduced through loudspeaker 32 simultaneously with the projection of the picture on a suitable screen.

If it is desired at this time to rerecord the sound onto a photographic film which will later be used in making a combined sound picture release print, the switch 33 is made to engage contact 36 and switch 39 is made to engage both of the contacts 41 and 42.

While a recording magnetic head 2 and a reproducing magnetic head 5 are shown, one head only need be employed for both recording and reproducing. For example, conventional switching means may be provided to switch the leads of the coil on head 2 from contacts 3 and 4 to contacts 6 and 7 for reproduction by magnetic head 2.

When a non-perforated magnetic sound tape is driven by a pulley, it is inevitable that there will be some slippage and therefore non-uniform forward motion of the tape at the driving surface. This will result during reproduction in a lack of exact synchronization of the sound and the picture projected from a constant speed sprocket drive unless, during reproduction, the sound tape is driven with the same speed variations it experienced during recording.

Applicant conceived of the method and means as shown in the drawings in which the speed of a tape driving motor in reproduction can be varied in accordance with frequency variations of the reproduced biasing frequency from the fixed frequency of the biasing current initially applied during recording. Applicant further conceived that a level of reproduced biasing current sufficiently high to operate electrical control apparatus can be obtained by employing a biasing frequency in recording which corresponds to the secondary peak frequency of the recording system employed.

The frequency characteristic reproduced from a magnetic tape is given by:

$$E=CIN\frac{V}{s}e^{-\tau/\lambda}\sin \pi s/\lambda \qquad (1)$$

where:

$E$=the voltage induced in the reproducing head
$I$=the current into the recording head
$C$=design constant
$N$=number of turns in reproducing head
$V$=linear velocity of reproduction
$s$=width of air-gap
$\lambda$=wave-length of the recorded signal
$\tau$=the demagnetization constant of the tape At low frequencies where $s/\lambda$ and $\tau/\lambda$ are very small, Equation 1 reduces to $$E=\frac{CINV\pi}{\lambda} \qquad (2)$$

This gives a frequency characteristic in which the output rises at a 6-decibel per octave rate as shown in the straight line portion of the response curve of Fig. 2.

As $\tau/\lambda$ and $s/\lambda$ increase with increasing frequency the factors $e-\tau\lambda$ and $\sin \pi s/\lambda$ affect the response. The effect of the first is to add an accelerating attenuation with increasing frequency, which causes the response to deviate from the 6-decibel per octave rise, reach a maximum at approximately 6,000 cycles and then decline rapidly. The rate of decline depends on the demagnetization constant $\tau$. The sine term also results in an increasing loss of output as $\lambda$ diminishes. Where $s\lambda=1$ the sine term becomes zero and complete extinction of the signal results. For values of $s/\lambda>1$ the sine term increases to a maximum value of unity when $s/\lambda=3/2$.

Fig. 2 shows the frequency response characteristic of a magnetic recording system employing a recording magnet having a 1.2-mil wide air-gap and a tape speed of 36 inches per second. It will be seen from Fig. 2 that a 30-kilocycle tone is obliterated. A secondary peak occurs at 45 kilocycles or at a frequency equal to one and one-half times the extinction frequency.

In accordance with this invention, therefore, the biasing current to be applied to the tape during recording is selected to correspond to the secondary peak frequency of the particular recording system. Thus, in the recording system mentioned above, 45 kilocycles would be selected as the frequency of the biasing current to insure that the reproduced signal will be ample for control purposes. The particular frequency chosen, therefore, depends upon the particular extinction frequency which, in turn, depends on the tape speed and effective air-gap width in the reproducing head. Thus, if the air-gap is 0.5-mil and the speed of the tape is 18 inches per second, the extinction signal will be 36 kilocycles and the secondary peak or selected biasing frequency will be 54 kilocycles. While the attenuation at 54 kilocycles will be about 10 decibels more than at the 45-kilocycle value, it might prove more desirable for recording purposes.

It is believed to be evident, therefore, that if the tape during reproduction is driven at any instant at a speed faster than or slower than the speed at which it was driven during recording, the frequency of the reproduced biasing current will be respectively higher than or lower than the fixed frequency of the biasing current recorded on the tape. It is these variations in the frequency of the reproduced biasing current from the constant frequency source of the recorded biasing current that are used to vary the speed of the tape driving motor during reproduction.

In the motor speed control unit indicated at 28, a conventional motor control circuit substantially similar to that disclosed in United States Patent 2,395,517, February 26, 1946, to H. M. Stoller, can be used but modified to the extent that the reproduced biasing frequency is used as the pilot frequency applied to coil 20 of the patent and the resonant circuit in the bridge arm 32 of the patent is tuned to the predetermined constant biasing frequency applied to the tape during recording.

Applicant provides a novel sound picture recording and reproducing method and system permitting the synchronous reproduction of sound from a magnetic tape and related pictures from a photographic film in which no complex additional equipment is required in recording and in which only conventional and relatively simple equipment is required for motor speed control in reproduction.

What is claimed is:

1. In a system for recording sound magnetically on and reproducing sound magnetically from a non-perforated magnetic tape, the method of controlling the speed of said tape during reproduction to correspond to the speed thereof during recording which comprises recording on said tape a supersonic biasing current simultaneously with an audio signal current, magnetically reproducing said currents, electrically separating said currents, and employing said reproduced biasing current to control the speed of said tape during reproduction.

2. In a system for recording sound magnetically on and reproducing sound from a non-perforated magnetic tape, the system employing magnetic recording and reproducing heads and means for moving the tape past the air gap in said heads, the method of controlling the speed of said tape during reproduction to correspond to the speed thereof during recording which comprises recording on said tape a signal current and simultaneously a biasing current the frequency of which is one and one-half times the extinction frequency of the recording system as determined by the width of the air-gap in said reproducing head and the speed of said tape during recording, magnetically reproducing said signal current and said biasing current and employing said reproduced biasing current to control the speed of said tape during reproduction.

3. In a system for recording sound on and reproducing sound from a non-perforated magnetic tape simultaneously with the recording of images on and reproducing images from a sprocket driven photographic film, the method of obtaining synchronous reproduction of sound from said tape and the picture from said film which comprises recording on said tape an audio signal current and a biasing current of predetermined constant frequency simultaneously with the recording of images on said photographic film, reproducing the signal and the biasing frequency from said tape simultaneously with the projection of images from said photographic film, determining the variations of said reproduced biasing current from the predetermined constant biasing frequency previously applied to said tape during recording and continuously adjusting the speed of movement of said tape during reproduction in correspondence with said variations.

4. A system for reproducing signals from a pulley propelled magnetic tape having impressed theron a sound signal and a biasing signal from a predetermined, constant frequency source, an electric motor for driving said tape propelling pulley during reproduction, current responsive speed control means for said motor, a magnetic head for translating said two signals into two corresponding electrical currents, separate electric channels for said currents connected to said magnetic head and an electrical connection between said motor speed control means and the one of said channels carrying the currents corresponding to said reproduced biasing signal, said motor control means being operative to vary the speed of said motor in response to a difference between the frequency of the reproduced biasing current and the constant frequency of the source of the biasing signal initially recorded on said tape.

5. The combination in a system for rerecording audio signal frequencies from a pulley-driven magnetic sound tape onto a sprocket propelled photographic sound film driven in synchronism with a photographic film bearing picture images recorded thereon simultaneously with the recording of the audio signal frequencies and a constant supersonic biasing frequency on said tape, a variable speed electric motor for driving said tape propelling pulley, a current responsive speed control means for said variable speed electric motor, synchronously operated electric motors for producing synchronized propulsion of said photographic sound film and said photographic picture film, a current responsive light modulating device associated with said photographic sound film, a magnetic head for translating the two signals recorded on said tape into electrical currents, an electric filtering system connected to said magnetic head and providing two channels for separating the currents corresponding to said audio signal from the currents corresponding to said supersonic bias signal, an electrical connection between the one of said channels carrying currents corresponding to said biasing signal and said motor speed control means and a second electrical connection between the one of said channels carrying currents corresponding to said audio signal and said light modulating device.

References Cited in the file of this patent

UNITED STATES PATENTS 2,116,314 Jenkins et al. ............ May 3, 1938
2,396,103 Neufeld ............... Jan. 31, 1950